(12) United States Patent
Terada

(10) Patent No.: US 7,019,204 B2
(45) Date of Patent: Mar. 28, 2006

(54) MUSICAL-SCORE-GENERATING INFORMATION PROCESSING APPARATUS AND METHOD

(75) Inventor: Kosei Terada, Hamamatsu (JP)

(73) Assignee: Yamaha Corporation, (JP)

( * ) Notice: Subject to any disclaimer, the term of this patent is extended or adjusted under 35 U.S.C. 154(b) by 264 days.

(21) Appl. No.: 10/369,394

(22) Filed: Feb. 19, 2003

(65) Prior Publication Data

US 2004/0159212 A1 Aug. 19, 2004

(51) Int. Cl.
*G10H 1/00* (2006.01)

(52) U.S. Cl. .............................. 84/601; 84/600; 705/64; 705/75; 705/76; 725/28; 725/31

(58) Field of Classification Search .............. 84/477 R, 84/483.1, 601; 705/64, 75, 76; 725/25–31; 380/234, 231
See application file for complete search history.

(56) References Cited

U.S. PATENT DOCUMENTS

| | | | | | |
|---|---|---|---|---|---|
| 4,350,070 | A | * | 9/1982 | Bahu | 84/612 |
| 5,400,687 | A | * | 3/1995 | Ishii | 84/477 R |
| 5,636,276 | A | * | 6/1997 | Brugger | 705/54 |
| 5,689,077 | A | * | 11/1997 | Jasinski | 84/477 R |
| 6,084,168 | A | * | 7/2000 | Sitrick | 84/477 R |
| 6,330,670 | B1 | * | 12/2001 | England et al. | 713/2 |
| 2003/0115150 | A1 | * | 6/2003 | Hamilton et al. | 705/64 |
| 2004/0225894 | A1 | * | 11/2004 | Colvin | 713/200 |

FOREIGN PATENT DOCUMENTS

JP 11-194752 7/1999

* cited by examiner

Primary Examiner—Marlon T. Fletcher
Assistant Examiner—David S. Warren
(74) Attorney, Agent, or Firm—Rossi, Kimms & McDowell, LLP

(57) ABSTRACT

Musical-score-related data set, including musical score information and right-to-use information defining a usable range of the musical score information, is distributed via a network or the like, and such a musical-score-related data set is stored in memory of an apparatus having received the data set. The right-to-use information includes information indicating that storage of the corresponding musical score is authorized or not authorized. When the musical score is to be displayed, the musical score information of the memory-stored musical-score-related data set is read out so that the musical score is visually displayed on a display device. When a musical score storage instruction or musical-score-display termination instruction is given by a user, a determination is made, on the basis of the right-to-use information of the memory-stored musical-score-related data set, whether storage of the musical score is authorized or not, and, if the storage of the musical score is not authorized, the corresponding musical score data set is deleted from the memory. The right-to-use information also includes information indicating that transmission of the corresponding musical score is authorized or not authorized, and, only when it is determined that the transmission is authorized, the transmission, to another apparatus, of the musical score is authorized.

12 Claims, 12 Drawing Sheets

MUSICAL-SCORE-GENERATING INFORMATION PROCESSING APPARATUS AND METHOD

BACKGROUND OF THE INVENTION

The present invention relates to a musical-score-generating information processing apparatus and method, a computer program corresponding to the musical-score-generating information processing method, and a storage medium containing the computer program. More particularly, the present invention relates to a novel technique for preventing unauthorized alteration and unauthorized copying of a musical score data set to be used for displaying a musical score.

Among the conventionally-known electronic musical instruments and personal computers (hereinafter also referred to as PCs) are ones which are capable of electronically displaying musical scores on the basis of sets of musical score data. Examples of the musical score data include not only data prerecorded in these instruments and PCs and data created by users using musical score creating software, but also data purchasable by being downloaded via the Internet as popularly known in recent years. With such musical score data, the users of the electronic musical instruments and PCs can cause musical scores of their desired music pieces to be visually shown on display screens of the instruments and PCs, so that they can use the displayed musical scores to practice performing the desired music pieces.

When an ensemble performance is to be executed using a plurality of musical instruments, a human player of each of the musical instruments has to purchase a same set of musical score data via the Internet or the like. However, the necessary purchasing operation is often too complicated for human players who are unaccustomed to on-line shopping through the Internet or the like and novice human players unfamiliar with music, so that the unaccustomed and novice human players tend to purchase different or wrong musical score data sets due to their operation errors or the like.

If, in view of such circumstances, a musical score data provider permits copying of a musical score data set, purchased by a particular person, so that one or more persons other than the particular person can share the copied musical score data set, it is possible that the musical score data will be leaked to an unintended third person and thus unauthorized alteration and unauthorized copying of the musical score data will result undesirably.

SUMMARY OF THE INVENTION

In view of the foregoing, it is an object of the present invention to provide a musical-score-generating information processing apparatus and method which can reliably prevent unauthorized alteration and unauthorized copying of data of musical score information while allowing human players of an ensemble performance to share the musical score information, as well as a computer program corresponding to the musical-score-generating information processing method and a storage medium containing the computer program.

To accomplish the above-mentioned object, the present invention provides a musical-score-generating information processing apparatus, which comprises: a display device; a data input section that inputs musical-score-related data into the information processing apparatus from outside (from an external source), the musical-score-related data including musical score information and right-to-use information defining a usable range of the musical score information; a storage section that stores musical-score-related data input via the data input section; an instruction supply section that gives an instruction to be executed by the information processing apparatus; and a control section that, when a musical score display instruction is given by the instruction supply section, performs control to read out the musical score information of musical-score-related data stored in the storage section, and that, when a predetermined instruction is given by the instruction supply section, determines, on the basis of the right-to-use information of corresponding musical-score-related data stored in the storage section, whether or not storage of a corresponding musical score is authorized. If the control section determines that the storage of the corresponding musical score is not authorized, the control section performs control to delete the corresponding musical-score-related data from the storage section. As an example, when a musical score storage instruction or musical-score-display termination instruction is given, as the predetermined instruction, by the instruction supply section, the control section makes the determination, based on the right-to-use information, as to whether or not the storage of the corresponding musical score is authorized.

According to the present invention, a determination is made, on the basis of the right-to-use information included in a musical-score-related data set, as to whether storage of the corresponding musical score is authorized or not, and, if it is determined that the storage of the corresponding musical score is not authorized (i.e., inhibited), the musical-score-related data set is deleted from the storage section. Thus, the information processing apparatus, which records therein a musical-score-related data set including right-to-use information thereof, can display the corresponding musical score at a time point when the musical-score-related data set has been input from outside the processing apparatus, but can neither display nor transmit the musical-score-related data set at later time because it is automatically deleted after being input from outside.

The present invention may be constructed and implemented not only as the apparatus invention as discussed above but also as a method invention. Also, the present invention may be arranged and implemented as a software program for execution by a processor such as a computer or DSP, as well as a storage medium storing such a program. Further, the present invention may be implemented as a storage medium containing musical-score-related data organized in a novel data format. Furthermore, the processor used in the present invention may comprise a dedicated processor with dedicated logic built in hardware, not to mention a computer or other general-purpose type processor capable of running a desired software program.

The following will describe embodiments of the present invention, but it should be appreciated that the present invention is not limited to the described embodiments and various modifications and variations of the invention are possible without departing from the basic principles. The scope of the present invention is therefore to be determined solely by the appended claims.

BRIEF DESCRIPTION OF THE DRAWINGS

For better understanding of the object and other features of the present invention, its preferred embodiments will be described hereinbelow in greater detail with reference to the accompanying drawings, in which.

Figure 1:
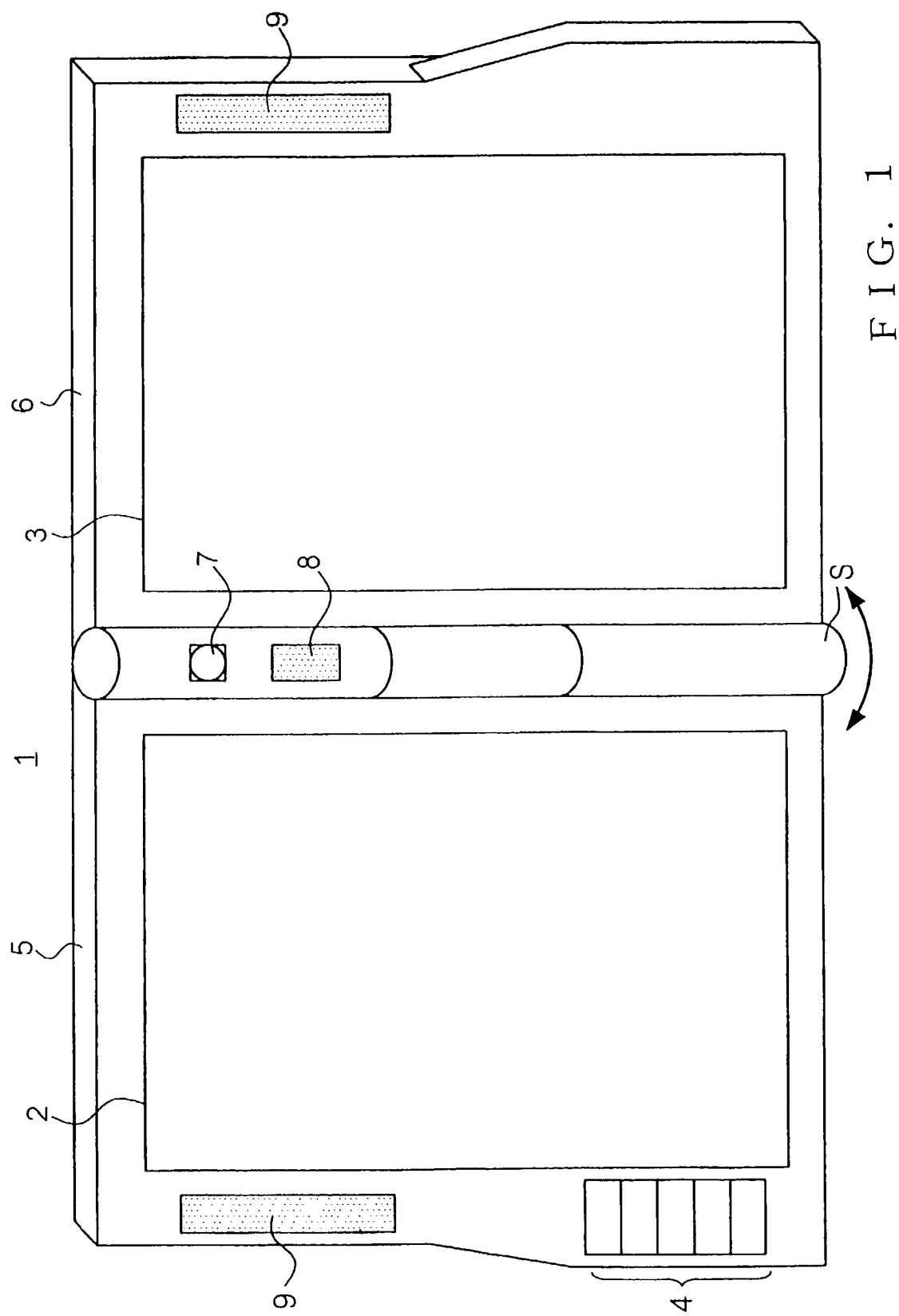
FIG. 1 is an external appearance view of a musical-score-generating information processing apparatus in accordance with an embodiment of the present invention.

DETAILED DESCRIPTION OF THE EMBODIMENTS (1) Structure of Embodiment:

(1.1) External Structure of Musical-Score-Generating Information Processing Apparatus:

FIG. 1 is a view showing an external appearance of a musical-score-generating information processing apparatus in accordance with an embodiment of the present invention. The musical-score-generating information processing apparatus 1 is formed into substantially the same size as an ordinary paper-written musical score, and it has, among various other functions, a function of displaying a musical score on the basis of a musical score data set previously purchased by a user of the processing apparatus 1. Namely, the musical-score-generating information processing apparatus 1 can be used generally in the same manner as an ordinary paper-written musical score by being placed on a music stand at the time of a performance. Any desired musical score data set may be purchased in the conventionally-known manner where the data set is downloaded via the Internet, and thus the manner of purchasing the desired musical score data set will not be described in detail here.

Namely, because the musical-score-generating information processing apparatus 1 of the invention to be described here is designed to also function as a musical score, it will hereinafter be referred to also as a "musical-score-type information processing apparatus 1".

Figure 2:
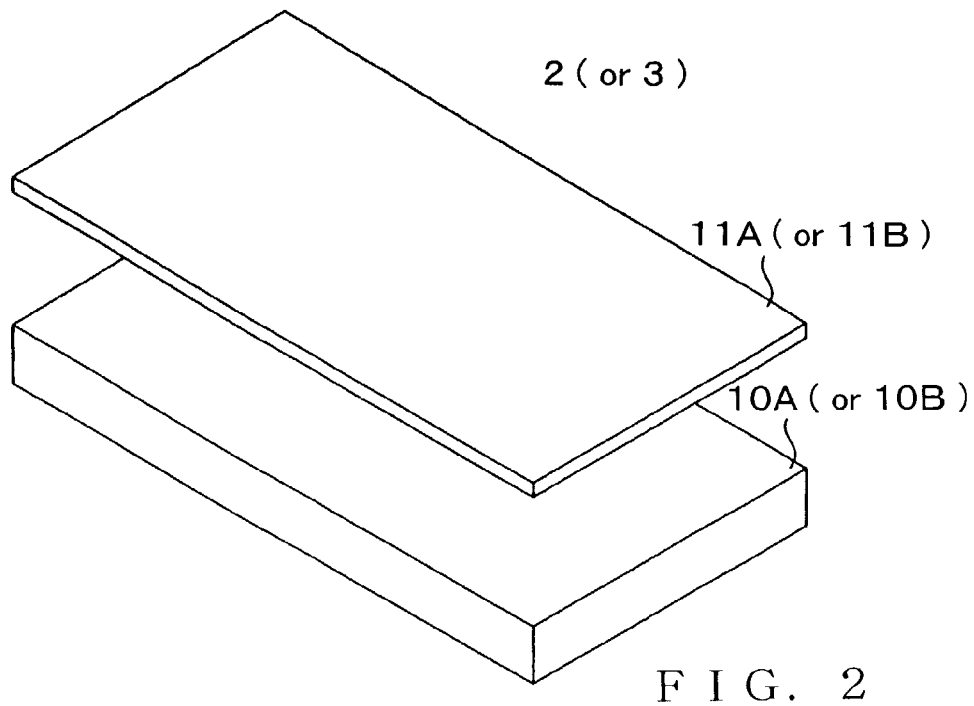
FIG. 2 is a view showing exemplary structure of display screens employed in the musical-score-generating information processing apparatus of FIG. 1.

As shown in FIG. 1, the musical-score-type information processing apparatus 1 of the present invention includes a substantially rectangular body of a small thickness, which has a pair of left and right display screens 2 and 3 for displaying a musical score and the like as will be later described in detail. As illustrated in FIG. 2, each of the left and right display screens 2 and 3 includes a liquid crystal display (LCD) panel 10A or 10B and a transparent touch panel 11A or 11B mounted thereon. Depression operation by a user's finger or stylus and depressed position on each of the display screens 2 and 3 can be detected via the corresponding touch panel 11A or 11B. Further, in FIG. 1, reference numeral 4 represents a group of operation switches including a power switch. Namely, user's instructions are input to the musical-score-type information processing apparatus 1 by user's operation of any of the operation switches 4 and/or depression on any one of the display screens 2 and 3.

Figure 3:
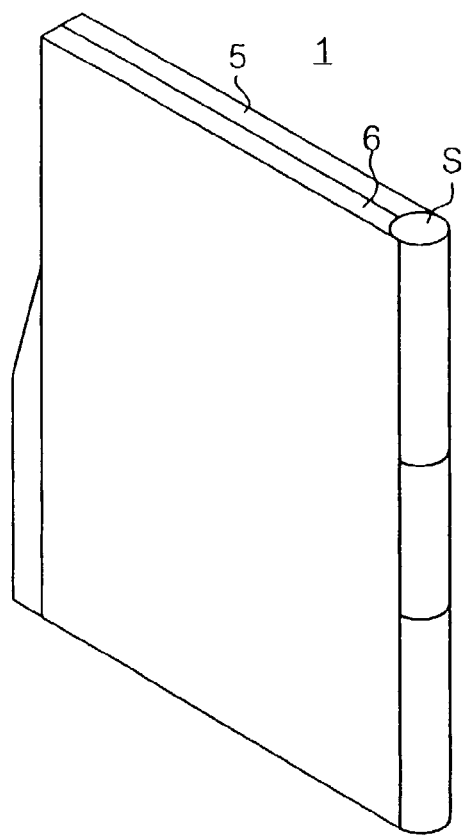
FIG. 3 is an external appearance view of the musical-score-generating information processing apparatus when two case members are in a closed position.

The musical-score-type information processing apparatus 1 also includes left and right case members 5 and 6 pivotally coupled with each other via a hinge mechanism S. The musical-score-generating information processing apparatus 1 can be opened and closed as desired like an ordinary notebook and written musical score (music book). Thus, the musical-score-type information processing apparatus 1 can be reduced in size by bringing the left and right case members 5 and 6 into an overlapped or closed position, as illustrated in FIG. 3, so that it can be carried with ease. When the musical-score-type information processing apparatus 1 is in the closed position, the display screens 2 and 3 etc. are not exposed to the outside so that they can be effectively protected from external damaging force etc.

The musical-score-type information processing apparatus 1 also includes a camera 7, microphone 8 and speaker 9. The camera 7 is provided for photographing a scene in front of the information processing apparatus 1, i.e. a human player performing on the basis of a displayed musical score, while the information processing apparatus 1 is in the opened position (i.e., position of FIG. 1). The microphone 8 is a directional microphone, which is provided for picking up sounds generated in front of the information processing apparatus 1, i.e. sounds performed by the human player or voices uttered by the human player or singer, while the information processing apparatus 1 is in the opened position. The speaker 9 is provided for sounding or audibly reproducing sounds generated on the basis of MIDI (Musical Instrument Digital Interface) data or sound data recorded in the information processing apparatus 1. Further, the musical-score-type information processing apparatus 1 contains a memory card reader/writer 12 and has a memory card inserting slot (not shown) formed in a side position thereof.

Figure 4:
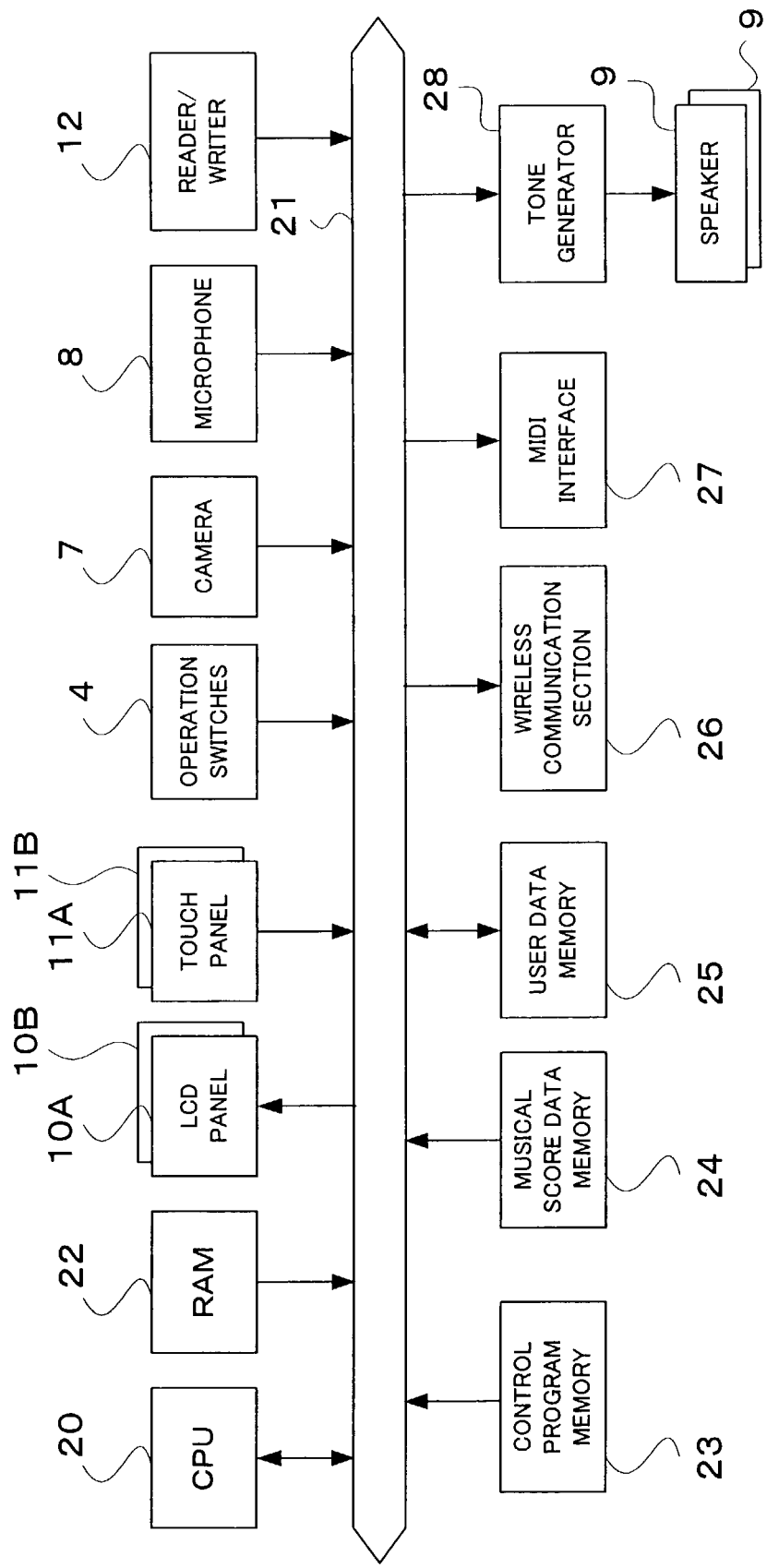
FIG. 4 is a block diagram showing electrical structure of the musical-score-generating information processing apparatus of FIG. 1.

(1.2) Electrical Structure of the Musical-Score-Type Information Processing Apparatus:

Now, a description will be given about electrical structure of the musical-score-type information processing apparatus 1, with reference to FIG. 4. In FIG. 4, a CPU (Central Processing Unit) 20 controls respective operation of various components connected thereto via a bus 21, to thereby control the entire musical-score-type information processing apparatus 1. RAM (Random Access Memory) 22 is used as buffer and working memories, in which are temporarily stored image data, program data, etc.

Further, the musical-score-type information processing apparatus 1 includes a control program memory 23, musical score data memory 24 and user data memory 25 that are implemented by a recording device, such as a magnetic disk or EEP-ROM (Electrically Erasable Programmable Read-Only Memory). In the control program memory 23, there are stored a group of control programs defining sets of processing steps to cause the CPU 20 to perform various processes such as a musical score display process and communication process to be later described. In the musical score data memory 24, there are stored sets of musical score data representative of a plurality of music pieces. Further, the user data memory 25 is provided for storing data of pictures and sounds taken and recorded by the user.

Further, in the musical-score-type information processing apparatus 1, a wireless communication section 26 carries out wireless data communication with a router, other musical-score-type information processing apparatus 1, PC or the like via an antenna under control of the CPU 20. For example, a wireless module corresponding to a wireless RAN, such as Bluetooth (registered trademark), is applied as the wireless communication section 26. With the wireless communication section 26, the information processing apparatus 1 can be connected via a router to the Internet so that, via the Internet, the information processing apparatus 1 can download musical score data or communicate with one or more other musical-score-type information processing apparatus 1 to receive musical score data from the one or more other musical-score-type information processing apparatus 1. Of course, the wireless communication section 26 may be replaced with a wired communication section or Ethernet.

The musical-score-type information processing apparatus 1 also includes a MIDI interface 27, which allows the information processing apparatus 1 to communicate MIDI data with an electronic musical instrument or PC having a MIDI interface. Tone generator 28 generates a sound signal from sound data or MIDI data under control of the CPU 20, so that the thus-generated sound signal is audibly reproduced via the speaker 9 after being processed by a digital-to-analog converter circuit.

(1.3) Format of Musical Score Data:

As illustratively shown in FIG. 5, each set of musical-score-related data (hereinafter referred to simply as "musical score data") DM used in the instant embodiment includes not only musical score information DM1 corresponding to conventional musical score data but also right-of-use information DM2 specifying a usable range of the musical score information DM1. Specifically, the right-of-use information DM2 has a storage authorization flag FS to authorize or to not authorize (i.e., inhibit) storage of the musical score data set DM, and a transmission authorization flag FT to authorize or to not authorize transmission of the musical score data set DM. When the storage authorization flag FS is of a value "1", it indicates that storage of the musical score data set DM is authorized (i.e., that the information processing apparatus 1 is given authorization, or permitted, to transmit the musical score data set DM), while when the storage authorization flag FS is of a value "0", it indicates that storage of the musical score data set DM is not authorized (i.e., that the information processing apparatus 1 is inhibited from transmitting the musical score data set DM). When the transmission authorization flag FT is of a value "1", it indicates that transmission of the musical score data set DM is authorized, while when the transmission authorization flag FT is of a value "0", it indicates that transmission of the musical score data set DM is not authorized.

Figure 5:
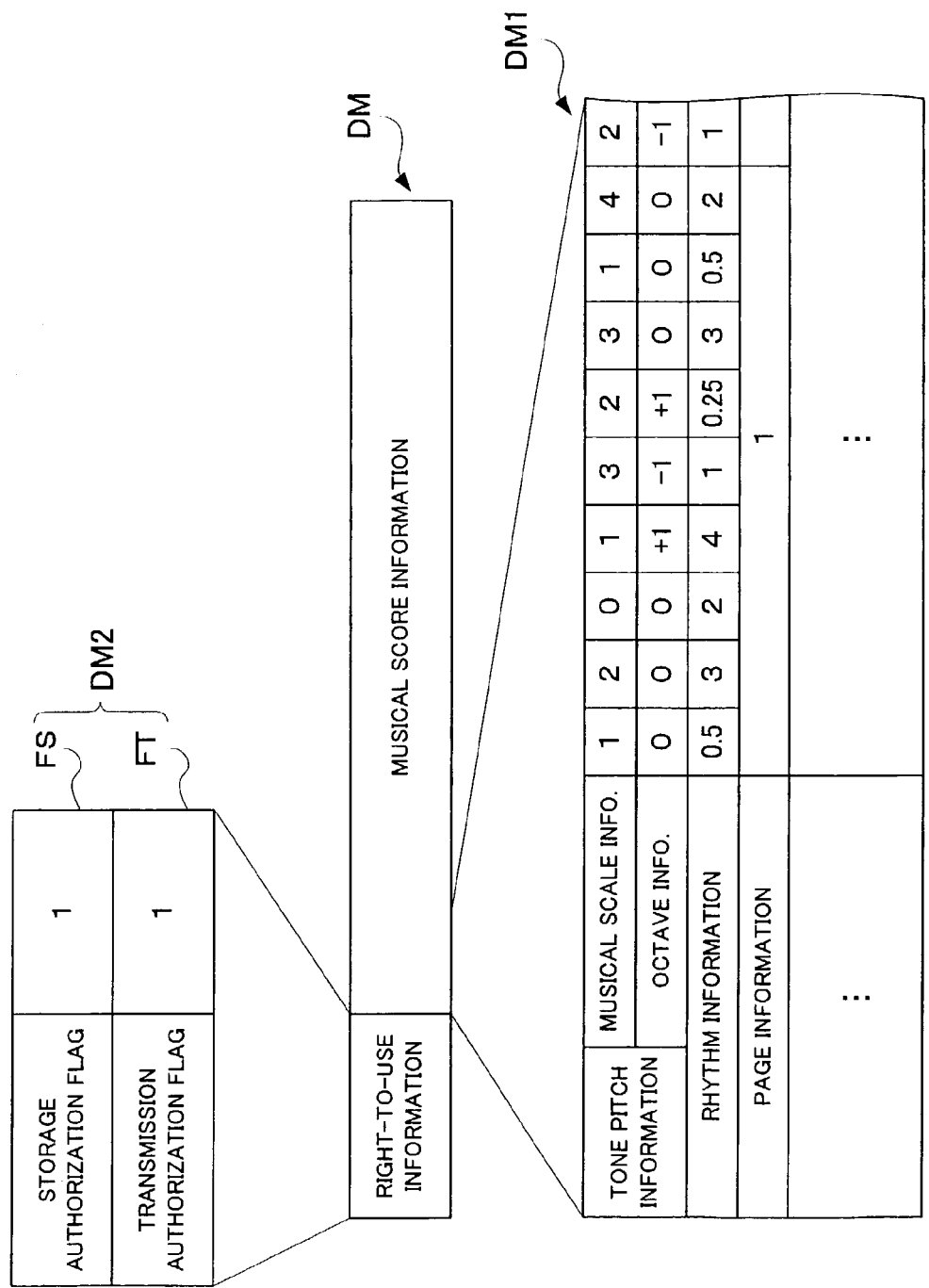
FIG. 5 is a diagram showing contents of a musical score data set handled in the musical-score-generating information processing apparatus.

Further, in the illustrated example of FIG. 5, the musical score information DM1 includes a field of tone pitch information, rhythm information and page information, and the tone pitch information includes musical scale information and octave information. The musical scale information represents scale notes, such as "C", using numerical values. Specifically, the musical scale information represents scale notes by numerical values, calculated on the basis of reference numerical value "0" indicative of note "C" with each half step counted by one; for example, numerical value "1" represents note "C#1" that is a half step higher in pitch than note "C", and numerical value "2" represents note "D" that is a whole step higher in pitch than note "C".

The octave information indicates, using plus and minus signs "+" and "−", whether the octaves to which the scale notes belong are higher or lower than the octave to which the reference note belongs, and also indicates, using numerical values, respective octave intervals of the scale notes from the reference note. For example, "+1" represents a scale note one octave higher than the reference note, and "−1" represents a note one octave lower than the reference note. Therefore, scale note "C#", one octave higher than the reference note "C", is represented by the musical scale information "1" and the octave information "+1".

Further, the rhythm information represents respective lengths of the scale notes by numerical values that are calculated on the basis of a reference value "1" indicating the length of a quarter note. For example, "0.5" designates half the length of a quarter note, i.e. the length of an eighth note, and "4" designates four times the length of a quarter note, i.e. the length of a whole note. Furthermore, the page information indicates which page of the musical score data set the tone pitch information, rhythm information, etc. belongs to. In addition to the above-mentioned information, the musical score data set includes tempo information designating a performance tempo and information indicating a title, composer's name, lyric writer's name, etc. of the music piece.

Further, the musical-score-type information processing apparatus 1 can display pages of a musical score on the display screens 2 and 3 by the CPU 20 reading out a corresponding musical score data set DM of a desired music piece in accordance with a user instruction and generating, in accordance with a predetermined algorithm, image data to be written on staves of the musical score.

(1.4) Processes Performed by the Musical-Score-Type Information Processing Apparatus:

Next, a description will be given about various processes carried out by the musical-score-type information processing apparatus 1.

The musical-score-type information processing apparatus 1 has a plurality of operation modes so that, by switching to an appropriate one of the operation modes, it can be connected to the Internet, or can execute data communication, musicals score display, photographing or sound recording. Specifically, the musical-score-type information processing apparatus 1 has, as the operation modes, an Internet mode, communication mode, musical score display mode, photographing mode and sound recording mode. The following paragraphs describe the individual operation modes while focusing on handling of musical score data DM.

a. Internet Mode:

The Internet mode is an operation mode in which the musical-score-type information processing apparatus 1 is connected to the Internet or global communication network. Once the Internet mode is selected, the CPU 20 reads out and executes a predetermined browser program stored in the control program memory 23 to thereby connect the processing apparatus 1 to the Internet via a router. Then, on the basis of an instruction entered by the user via the touch panel 11A, 11B or the like, the CPU 20 accesses a home page (HP) of a desired URL (Uniform Resource Locator) to acquire image data etc. and then display corresponding images.

In this way, the musical-score-type information processing apparatus 1 allows the user to browse the Internet, access a server providing download service of a musical score data set DM of a desired music piece and thereby download the musical score data set DM, in much the same way as a conventional PC. In this case, the server transmits the musical score data set DM with the storage authorization flag FS and transmission authorization flag FT of the right-to-use information DM2 both set at the value "1". Namely, the musical score data set DM, of which storage and transmission are authorized, is recorded into the musical score data memory 24 of the musical-score-type information processing apparatus 1 of the purchaser.

b. Communication Mode:

The communication mode is an operation mode where the musical-score-type information processing apparatus 1 is connected wirelessly with other musical-score-type information processing apparatus 1, constructed similarly to the information processing apparatus 1 in question, to constitute a wireless communication network (i.e., local communication network such as Bluetooth connection) so that the information processing apparatus 1 in question can communicate musical score data DM stored in the musical score data memory or data recorded in the user data memory 25 with a designated one or ones (in some cases, all) of the other musical-score-type information processing apparatus 1. Where a musical score data set DM is to be transmitted, the CPU 20 of the musical-score-type information processing apparatus 1 determines whether transmission of the musical score data set DM to be transmitted is authorized or not, and, only when it is determined that the transmission is authorized, the CPU 20 transmits the musical score data set DM. Note that, in the illustrated example, data other than musical score data DM, such as moving picture data and sound data, are transmitted to a destination musical-score-type information processing apparatus without the above-mentioned determination being made on the authorization status. The local communication network is not necessarily limited to the wireless type, and it may be of a cordless type such as an ultrasonic communication or infrared communication type; alternatively, a wired LAN may be built.

Now, a description will be made about a process carried out by the CPU 20 of the musical-score-type information processing apparatus 1 when a musical score data set DM is to be transmitted, with reference to a flow chart of FIG. 6.

First, once the user instructs transmission of a musical score data set DM by operating a predetermined operation button (not shown) displayed in the communication mode, the CPU 20 of the musical-score-type information processing apparatus 1 displays file names of musical score data sets DM, currently stored in the musical score data memory 24, on the display screens 2 and 3 to prompt the user to select the desired musical score data set DM, at step S1. Note that the file name of the desired musical score data set DM may be entered directly by the user. Alternatively, the musical score data sets DM currently stored in the musical score data memory 24 may be displayed in thumbnails so that the desired musical score data set DM may be selected from among the displayed thumbnails.

Then, once the musical score data DM to be transmitted has been selected, the CPU 20 reads out the musical score data DM at step S2, and it determines, at step S3, whether or not the transmission authorization flag FT of the right-to-use information D2 in the read-out musical score data set DM is at the value "1". If the transmission authorization flag FT is at the value "1" as determined at step S3, the CPU 20 resets or rewrites both of the transmission authorization flag FT and storage authorization flag FS of the musical score data set DM to the value "0" at step S4, and then it transmits the read-out musical score data set DM to a destination musical-score-type information processing apparatus 1 at step S5. Namely, if the transmission of the musical score data set DM is authorized, the musical score data set DM, having its right-to-use information DM2 having been rewritten into such contents as to not authorize transmission and storage, is transmitted to the destination musical-score-type information processing apparatus.

Figure 6:
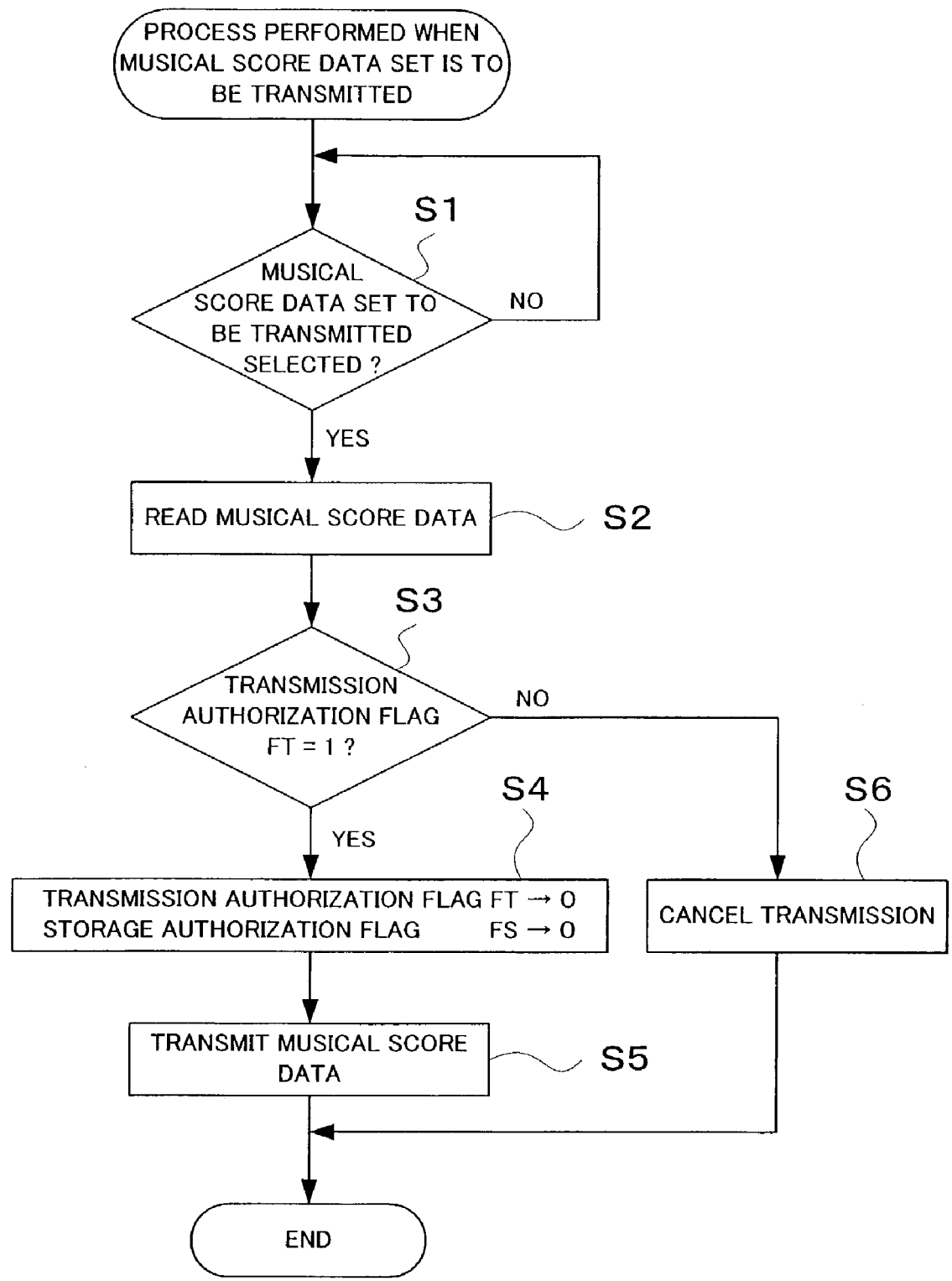
FIG. 6 is a flow chart of a process performed in the musical-score-generating information processing apparatus when a musical score data set is to be transmitted.

If, on the other hand, the transmission authorization flag FT is at the value "0" as determined at step S3, the CPU 20 terminates the musical score data process of FIG. 6 by performing an operation for canceling the transmission of the musical score data set DM, at step S6. The transmission canceling operation includes displaying a message like "transmission of the musical score data set is not authorized". Namely, if the transmission of the musical score data set DM is not authorized, the transmission of the musical score data set is inhibited.

As set forth above, the musical-score-type information processing apparatus 1 is constructed to determine, on the basis of the right-to-use information DM2 of the musical score data set DM, whether the musical score data set DM may be transmitted or not. Even when it has been determined the musical score data set DM may be transmitted to a destination musical-score-type information processing apparatus 1, the information processing apparatus 1 transmits the musical score data set DM with its right-to-use information DM2 rewritten into such contents as to not authorize further transmission, so that it is possible to reliably prevent the musical score data set DM from being further transmitted from the destination musical-score-type information processing apparatus to still another musical-score-type information processing apparatus. Namely, according to the instant embodiment, only the musical-score-type information processing apparatus 1 having recorded therein a musical score data set DM duly purchased thereby, i.e. only the musical-score-type information processing apparatus 1 belonging to a fair purchaser of the musical score data set DM, can transmit that musical score data set DM; therefore, the purchaser can properly manage the musical score data set DM as to transmission destination thereof.

c. Musical Score Display Mode:

The musical score display mode of the information processing apparatus 1 is an operation mode for displaying a musical score to be used for an instrument performance. Once this musical score display mode is selected by the user, the CPU 20 reads out and executes a predetermined musical score displaying program stored in the control program memory 23, and thus it prompts the user to select a desired musical score data set DM, for example, by displaying, on the display screens 2 and 3, file names of musical score data sets currently stored in the musical score data memory 24. Note that the musical score data memory 24 has also recorded therein one or musical score data sets having been received, in the communication mode, from one or more other musical-score-type information processing apparatus belonging to other purchasers.

Figure 7:
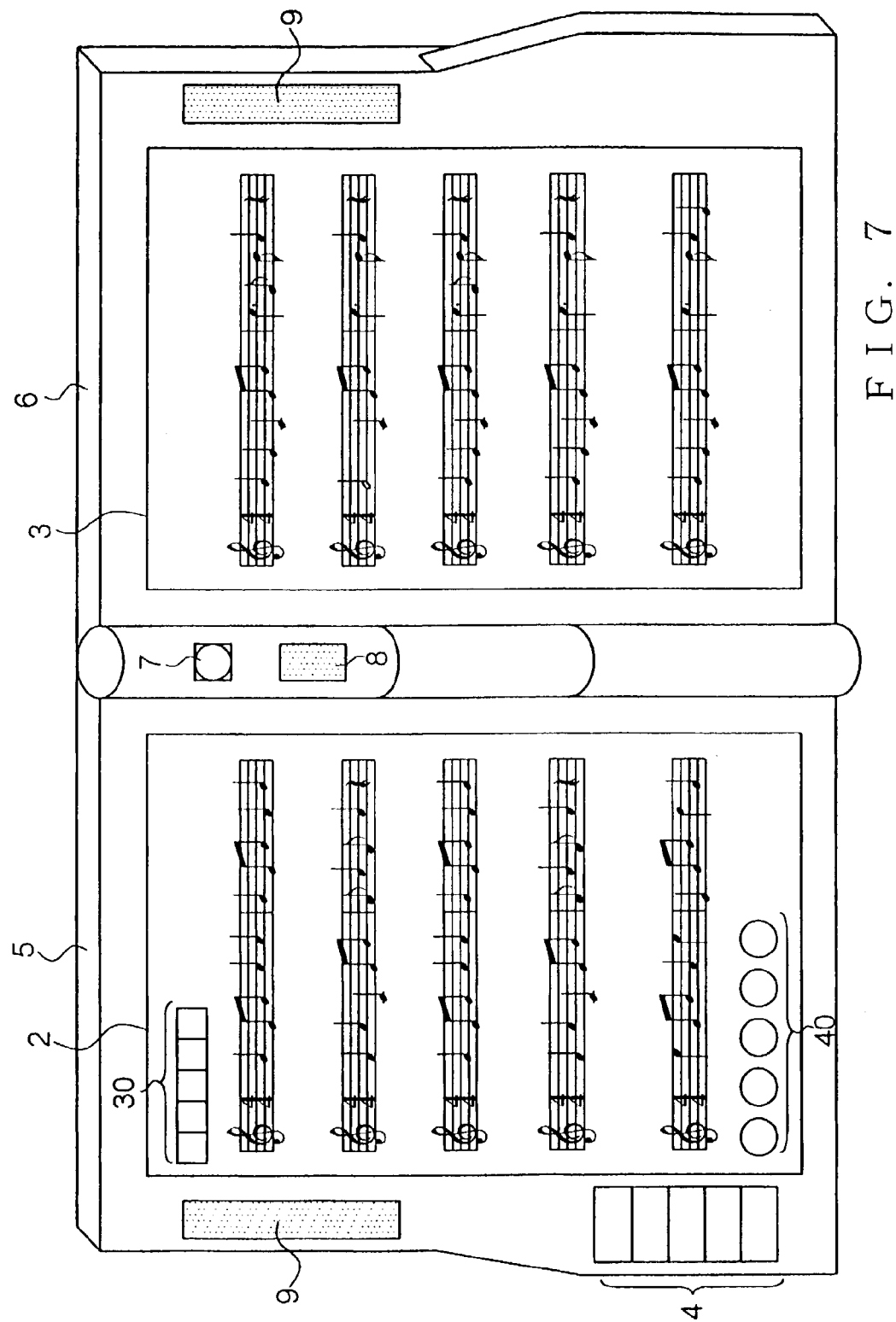
FIG. 7 is a diagram explanatory of a musical score display mode of the musical-score-generating information processing apparatus.

Further, once a desired one of the musical score data sets DM has been selected by the user, the musical-score-type information processing apparatus 1 displays first and second pages of the musical score on the display screen 2 and 3 by the CPU 20 reading out the corresponding musical score data DM from the musical score data memory 24 and generating musical score image data of the first and second pages. In this case, operation button groups 30 and 40 for instructing various operations are also displayed on the second display screen 2, as illustratively shown in FIG. 7. Specifically, the operation button group 30 comprises software buttons for instructing various musical-score-related operations, such as page forwarding, page returning, reversion to the beginning of a particular page, storage and editing of musical scores, other operations such as deletion and storage of hand-written images, and various setting operations. The operation button group 40 comprises software buttons for instructing a switch between the operation modes.

Figure 8:
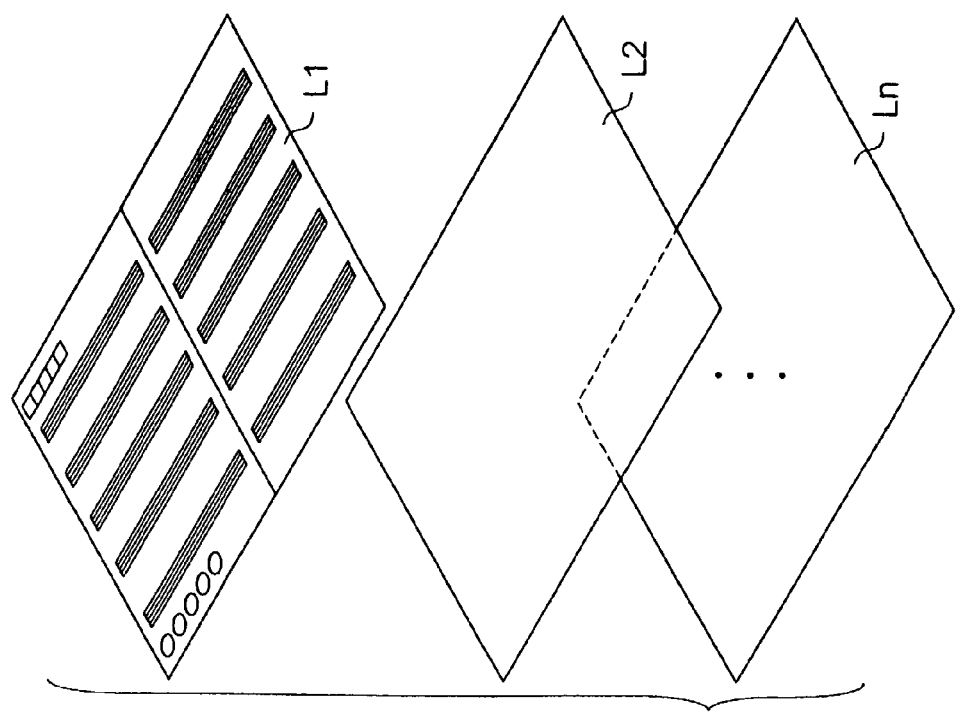
FIG. 8 is a view explanatory of a layered image structure when the musical-score-generating information processing apparatus displays a musical score.
Figure 8:
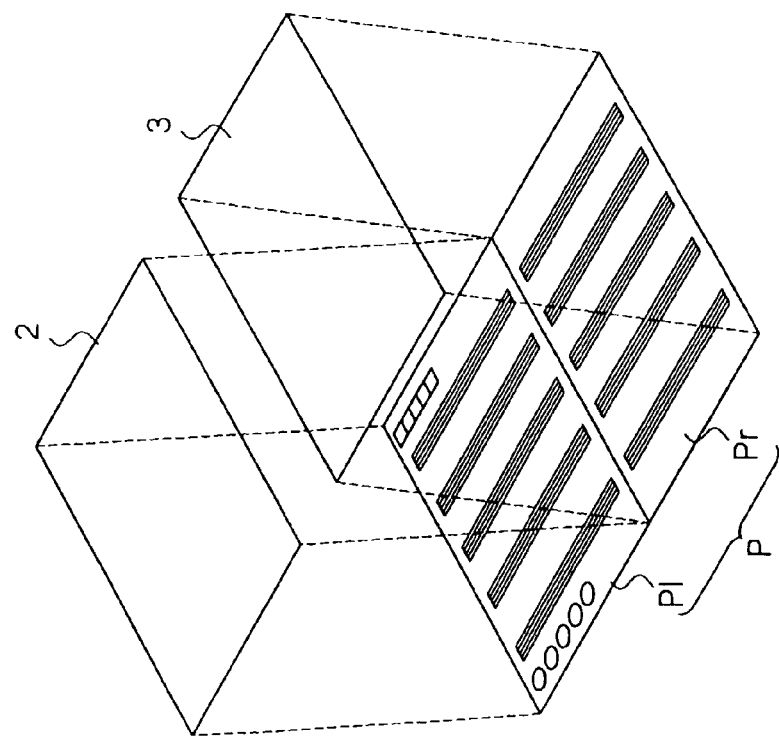
Figure 9:
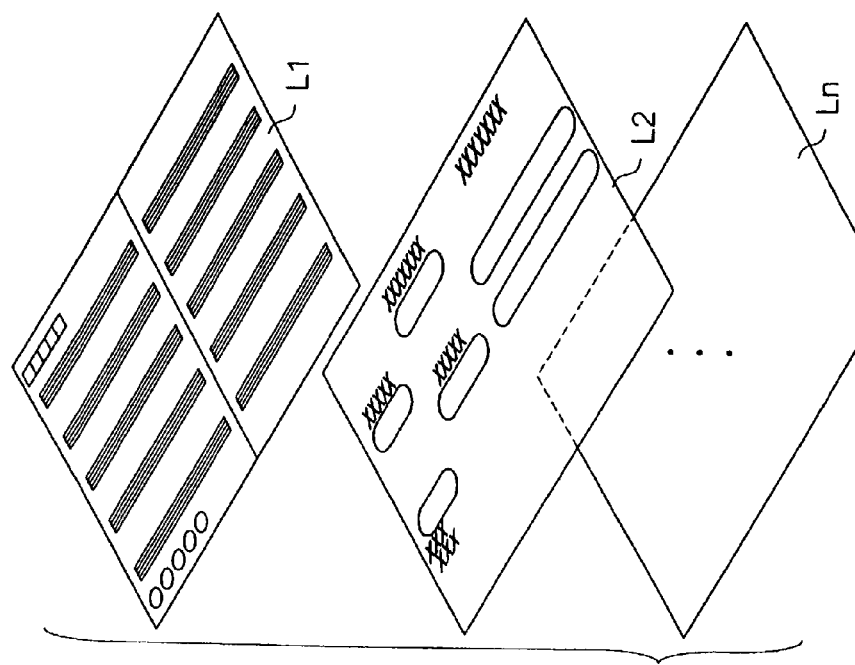
FIG. 9 is a view explanatory of a layered image structure when the musical-score-generating information processing apparatus displays a musical score and hand-written image.
Figure 9:
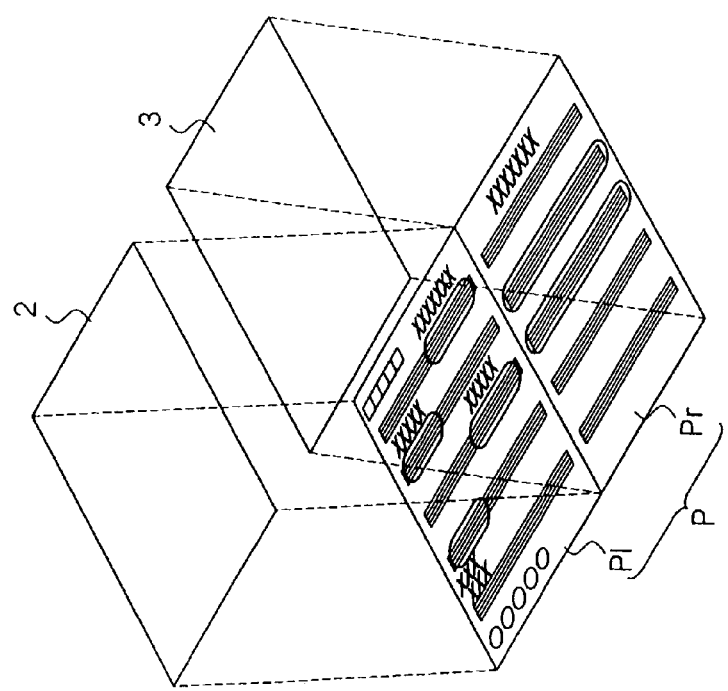

Further, in the musical score display mode of the information processing apparatus 1, the CPU 20 carries out a layer display process for displaying to-be-displayed imagery P in association with a plurality of layers, as illustrated in FIG. 8. FIG. 8 shows a case where images of a musical score and the operation button groups 30 and 40 are displayed on the first layer L1. In the illustrated example, no image is displayed on the second to nth layers L2 to Ln. The CPU 20 drives the liquid crystal display panels 10A and 10B so that an image Pl of a left region of the to-be-displayed imagery P is displayed on the liquid crystal display panel 10A while an image Pr of a right region of the to-be-displayed imagery P is displayed on the liquid crystal display panel 10B. In this way, the first page of the musical score is displayed on the left display screen 2, and the second page of the musical score is displayed on the right display screen 3.

Then, once the CPU 20 detects, on the basis of a depressed position on the touch panel 11A or 11B, that any one of the musical-score-related operation buttons of the button group 30 has been depressed, it performs an operation for updating the imagery P by changing the musical score pages displayed on the first layer L1. For example, when the page forwarding button has been depressed, the CPU 20 changes the musical score images displayed on the first layer L1 to musical score images of the succeeding musical score pages, to thereby update the musical score pages displayed on the screens 2 and 3 with the succeeding musical score pages. Furthermore, when depression of any one of the operation buttons of the group 40 has been detected via the touch panel 11A or 11B, the CPU 20 performs an operation for switching from one operation mode to another.

Figure 10:
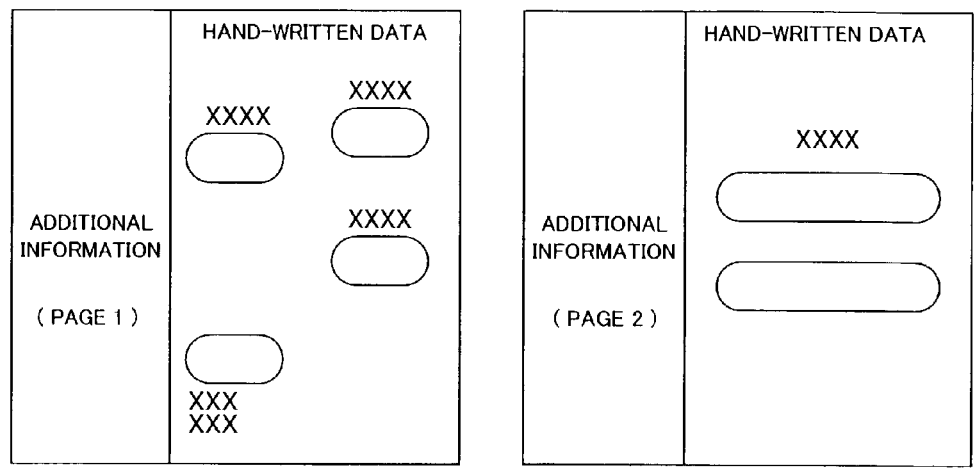
FIG. 10 is a diagram explanatory of a manner in which hand-written data are managed in the musical-score-generating information processing apparatus.
Figure 11:
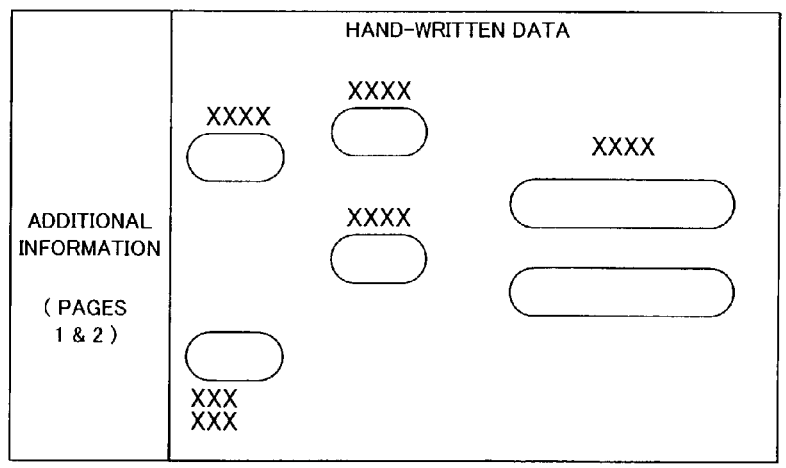
FIG. 11 is a diagram explanatory of another manner in which hand-written data are managed in the musical-score-generating information processing apparatus.

Further, if the depressed position detected via the touch panel 11A or 11B is other than the positions of the operation buttons 30 and 40, the CPU 20 generates image data of a trajectory of the depressed position (hereinafter referred to as "hand-written data"). Then, the CPU 20 displays the trajectory of the depressed position on the second layer L2 in real time so that the musical score images and the trajectory of the depressed position are displayed on the display screens 2 and 3 in an overlapped fashion. Namely, the touch panels 11A and 11B each function as an additional writing input section for entering desired additional information. Further, the CPU 20 stores the hand-written data in the RAM 22 along with additional information that specifies the current page of the musical score, file name of the musical score data set DM, display layer (second layer L2), etc. corresponding to the hand-written data, as illustratively shown in FIG. 10 or 11. In the above-described musical score page changing operation, reference is made to the thus-stored additional information. Thus, if there is hand-written data corresponding to the changed page, an image of the trajectory of the depressed position is displayed on the second layer L2, while if there is no hand-written data corresponding to the changed page, no image is displayed on the second layer L2. FIG. 10 is a conceptual diagram showing a scheme of storing each page of hand-written data along with page-by-page additional information that corresponds to that page alone, while FIG. 11 is a conceptual diagram showing another scheme of storing two successive pages of hand-written data stored along with collective additional information that corresponds to both of the pages; the instant embodiment may employ either one of the schemes shown in FIGS. 10 and 11. Thus, the user can directly write letters, patterns, etc. on the electronic musical score using a stylus or otherwise, in much the same way as on an ordinary paper-written musical score.

Whereas the instant embodiment has been shown and described as displaying a hand-written image (trajectory of a depressed position) on the second layer L2, the CPU 20 may display a hand-written image on any of the other layers (third to nth layers L3 to Ln) by performing operations similar to the above-described. Therefore, it is possible to write hand-written images into a plurality of different layers. Color and dot size (line thickness), with which a hand-written image is displayed, may also be set, as desired by the human operator, for each of the layers. Further, images of a musical score and operation button groups 30 and 40 may be displayed on any of the other layers than the first layer L1, as long as musical score images and hand-written image are displayed on different layers. Also note that images of a musical score and operation button groups 30 and 40 may be displayed on different layers rather than on the same layer.

Furthermore, the CPU 20 controls display ON/OFF states of the first to nth layers L1 to Ln, in accordance with operating states or settings of the operation buttons 30, so as to switch between a plurality of display modes, such as one where images of a musical score and hand-written image are displayed simultaneously, one where only images of a musical score is displayed, one where only a hand-written image is displayed and one where only a hand-written image of a predetermined layer is displayed. Namely, the musical-score-type information processing apparatus 1 can readily perform operations for selectively displaying or not displaying images of a musical score or hand-written image, because it displays images of a musical score or hand-written image on different layers.

Furthermore, when the hand-written-image storing operation button belonging to the button group 30 has been operated, the CPU 20 reads out hand-written data of a designated layer along with corresponding additional information and then stores the read-out data and additional information in the user memory 25 or on a memory card. Moreover, when readout of hand-written data recorded in the user memory 25 or on the memory card has been instructed, the CPU 20 determines, on the basis of the additional information included in the hand-written data, whether or not a musical data set DM corresponding to the hand-written data is currently recorded in the musical score data memory 24. If such a corresponding musical data set DM is currently recorded in the musical score data memory 24, the CPU 20 reads out and displays the corresponding musical data set DM, and, if the corresponding hand-written data is present on the displayed musical score page, then the CPU 20 displays an image of the hand-written data on a designated layer in the manner as described above. Thus, by storing his or her hand-written data alone on a memory card and carrying the memory card, the human operator can cause a musical score including an image, hand-written using his or her musical-score-type information processing apparatus 1, to be displayed on another musical-score-type information processing apparatus 1 as well.

As a result, the musical-score-type information processing apparatus 1 in question can not only simultaneously display successive pages of a musical score and turn over the pages of the musical score as with a conventional paper-written musical score, but also freely write onto the displayed musical score.

Moreover, when the musical-score storing operation button belonging to the button group 30 has been operated, the CPU 20 determines whether or not storage of a musical score data set DM to be stored is authorized, and, only when it is determined that the storage is authorized, the CPU 20 executes a process for storing the musical score data set DM.

Figure 12:
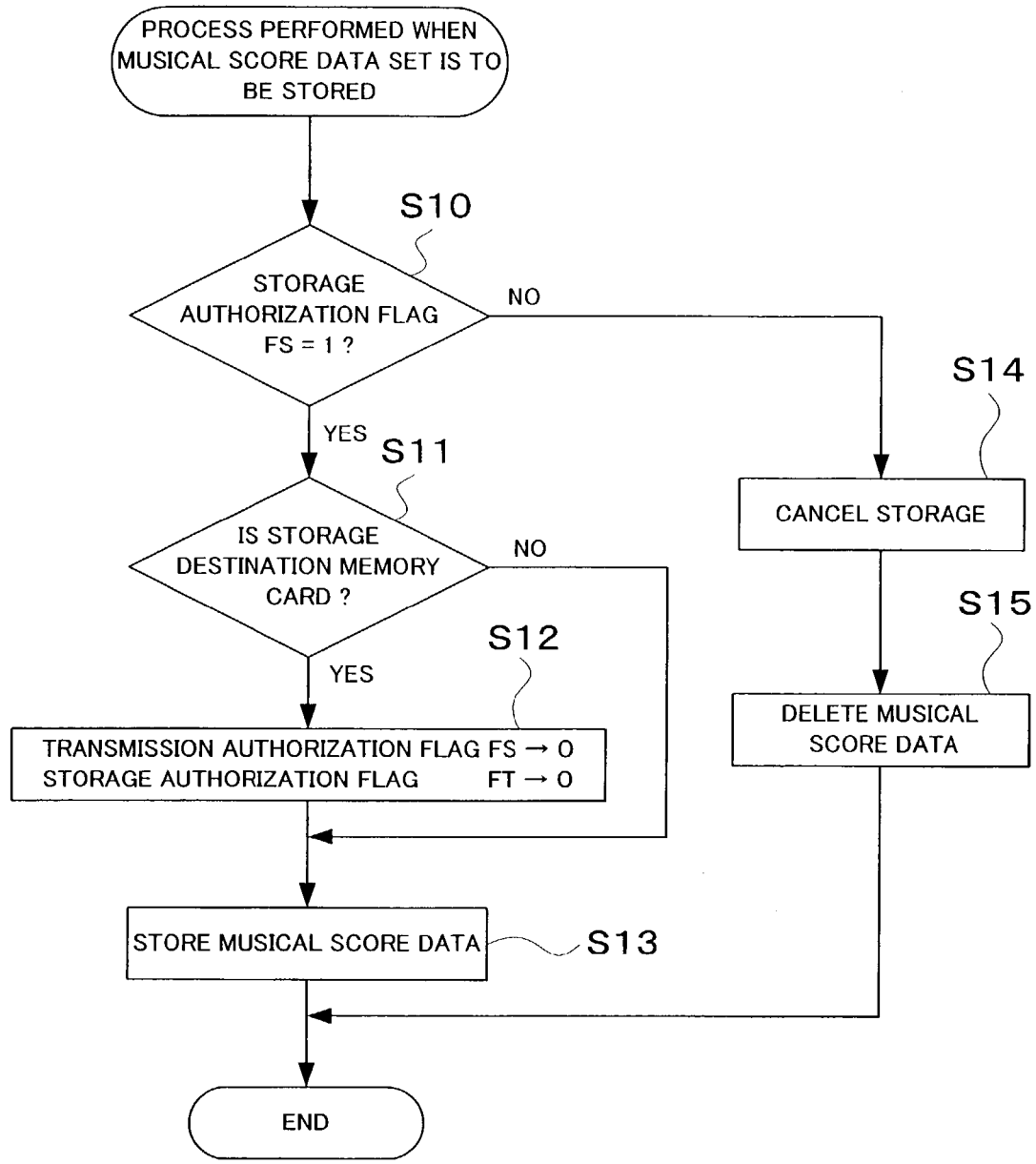
FIG. 12 is a flow chart of a process performed in the musical-score-generating information processing apparatus when a musical score data set is to be stored.

Now, with reference to a flow chart of FIG. 12, a description will be given about the process executed by the CPU 20 when a musical score data set DM is to be stored.

First, in the musical-score-type information processing apparatus 1, a determination is made, at step S10, as to whether or not the storage authorization flag FS is at the value "1", with reference to the right-to-use information DM2 of the musical score data set DM to be stored (being currently displayed). If the storage authorization flag FS is at the value "1" as determined at step S10, the CPU 20 of the processing apparatus 1 prompts the user to select a desired storage destination in which the musical score data set DM should be stored, and then determines at step S11 whether or not the selected storage destination is a memory card.

If the selected storage destination is a memory card as determined at step S11, the CPU 20 rewrites the transmission authorization flag FT and storage authorization flag FS of the musical score data set DM into the value "0" at step S12 and then stores the musical score data set DM on the memory card at step S13. If, on the other hand, the selected storage destination is not a memory card, i.e. if the selected storage destination is the musical score data memory 24, the musical score data set DM is stored in the musical score data memory 24 with no change made to the contents of the right-to-use information DM2, at step S13.

Specifically, when the musical score data set DM is to be stored, hand-written data and additional information displayed on any of the second to nth layers L2 to Ln are read out and associated with the musical score information displayed on the first layer L1, so that the hand-written data and additional information and musical score information are recorded together, as a complete set of musical score data, into the musical score data memory 24. Then, if the CPU 20 determines, on the basis of the additional information included in the musical score data set DM, that there is hand-written data corresponding to pages of the musical score to be displayed, the CPU 20 displays an image of the hand-written data on a designated layer, so that the musical score including the last-recorded hand-written image can be displayed.

If, on the other hand, the storage authorization flag FS is at the value "0" as determined at step S10, the CPU 20 carries out an cancellation operation to cancel the storage of the musical score data set DM at step S14, and then it deletes the musical score data set DM from the musical score data memory 24 at step S15. Here, the cancellation operation is directed to, for example, visually informing the user that the storage of the musical score data set DM is not authorize.

Namely, if the storage of the musical score data set DM is determined as inhibited on the basis of the right-to-use information DM2 of the musical score data set DM, the data set DM can not be stored although can be displayed; in this case, the use of the musical score data set DM is limited such that the data set DM can be displayed only once.

Further, because, when the musical score data set DM is to be stored on a memory card, the data set DM is stored with the right-to-use information DM2 having been rewritten into such contents as to not authorize the storage and transmission of the data set DM, the use of the musical score data set DM read out from the memory card is also limited such that the data set DM can be displayed only once and is inhibited from being transmitted from the processing apparatus 1. Also, when an instruction has been given for turning off the power to the musical-score-type information processing apparatus 1 or terminating the musical score display mode, the CPU 20 checks the storage authorization flag FS, and, if the storage authorization flag FS is at the value "0", the CPU 20 deletes the musical score data set DM from the musical score data memory 24. Thus, in the instant embodiment, each musical score data set DM, of which storage has been determined as not authorized, can be reliably deleted from the musical score data memory 24.

Namely, the instant embodiment of the musical-score-type information processing apparatus 1 is constructed to determine, on the basis of the right-to-use information DM2 of the musical score data set DM, whether or not the data set DM is to be stored or not. Also, when the musical score data set DM is to be stored on a memory card readable via another musical-score-type information processing apparatus 1, the data set DM is stored with the right-to-use information DM2 having been rewritten into such contents as to not authorize storage and transmission of the data set DM. Thus, the use of the musical score data set DM read out from the memory card is also limited such that the data set DM can be displayed only once and is inhibited from being transmitted from the musical-score-type information processing apparatus 1 in question.

With the arrangements set forth above, only the musical-score-type information processing apparatus 1, having recorded therein a storage-authorized musical score data set DM duly purchased by the user of the processing apparatus 1, is allowed to transmit and store the data set DM. Thus, if the purchaser of the musical score data set DM transmits the data set DM to another musical-score-type information processing apparatus 1 belonging to another person who wants to play an ensemble or hands the person the data set DM recorded (stored) on a memory card, the purchaser allows the musical-score-type information processing apparatus 1 of the other person to display the data set DM of the same music piece, and, after completion of the ensemble performance, can cause the musical score data set DM to be deleted from the information processing apparatus 1 of the other person. Therefore, the instant embodiment can reliably prevent any other person than the purchaser from re-using or altering the musical score data set DM.

Figure 13:
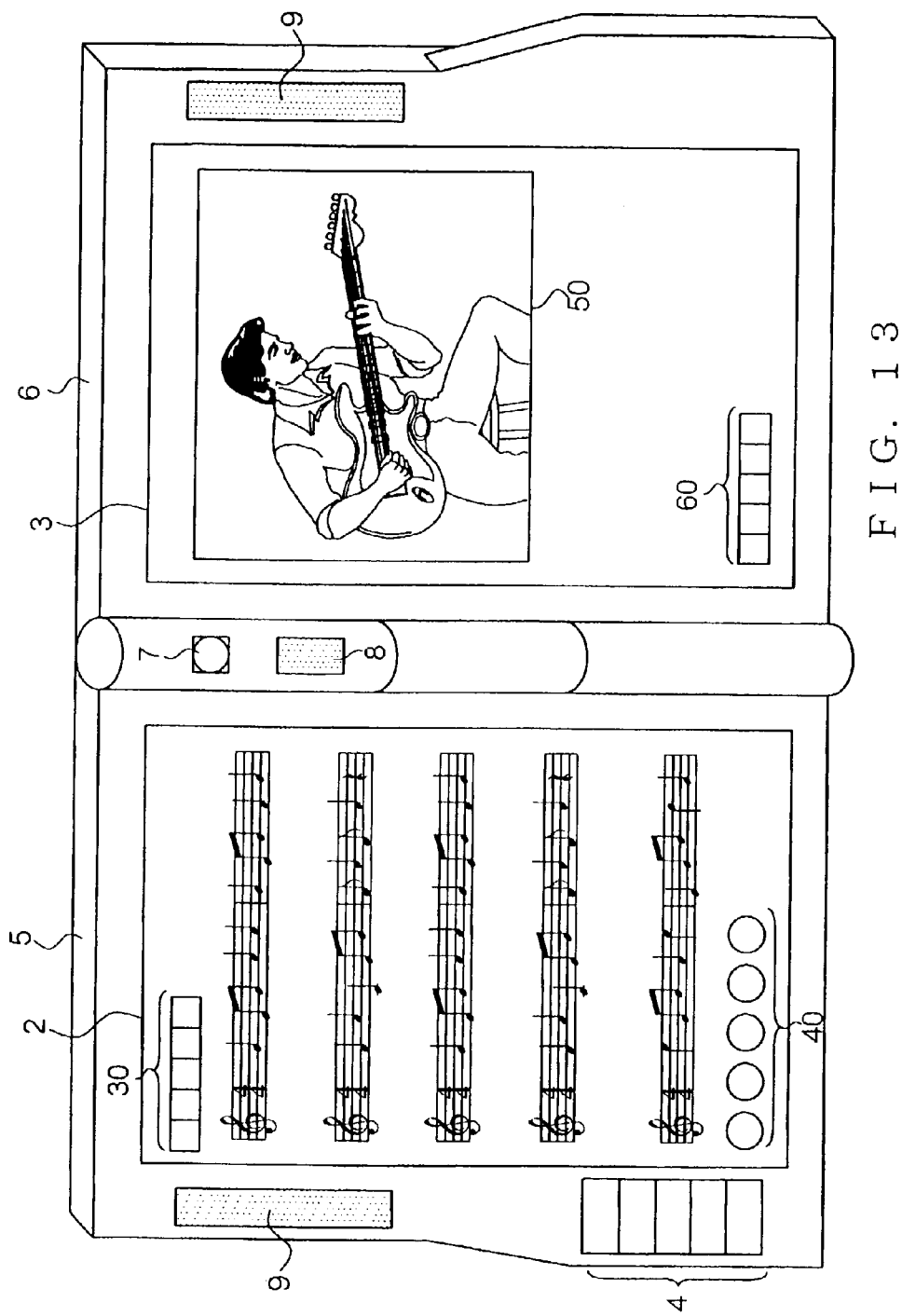
FIG. 13 is a diagram explanatory of a photographing mode of the musical-score-generating information processing apparatus.

Note that a hand-written image entered while a storage-unauthorized musical score data set DM is displayed may be deleted at the same time that the musical score data set DM is deleted. Alternatively, the hand-written data may be recorded into the user data memory 25 along with its additional information so that the user can utilize the hand-written data as necessary.

d. Photographing Mode:

The photographing mode is an operation mode for photographing the human player. Once this photographing mode is selected, the CPU 20 causes the display screen 3 to display a picture 50 taken via the camera 7. FIG. 13 shows an example display in the photographing mode. On the display screen 3, there is displayed, in addition to the camera-taken picture 50, an operation button group 60 for instructing various operations, such as a start of recording, stop of recording and reproduction. On the other display screen 2, there is displayed either a musical score that was being displayed immediately before switching to the photographing mode or a musical score corresponding to a musical score data set DM designated by the human player.

Then, in response to operation of any of the operation buttons 60, the CPU 20 executes a recording process for recording moving picture data representative of a picture input via the camera 7 and sound data input via the microphone 8 into the user data memory 25 in a synchronized fashion, a recording stop process, a reproduction process for reproducing moving picture and sound data previously recorded in the user data memory 25, or the like. In the recording process, the moving picture data may be recorded after being subjected to a compression/encoding process using a video encoding algorithm such as MPEG (Moving Picture Experts Group) 2 or motion JPEG (Joint Photographic Experts Group), while the sound data may be recorded after being subjected to a sound compression/encoding process using an audio encoding algorithm such as MPEG1 (layer 2). In an alternative, only the moving picture data may be recorded.

In the photographing mode, a musical score can be manipulated by operation of any of the operation buttons 30, a hand-written image can be written onto an electronic musical score, and only hand-written data can be stored, as in the above-described musical score display mode. In this mode, an electronic musical score is displayed only on the display screen 2, so that, when the page forwarding button or page returning button has been depressed, only one page of the electronic musical score is displayed at a time, unlike in the musical score display mode. Alternatively, a camera-taken picture 50 may be displayed on the display screen 2, with an electronic musical score being displayed only on the display screen 3. The human operator may choose on which of the display screens 2 and 3 a camera-taken picture 50 should be displayed.

Thus, in the photographing mode, an electronic musical score and camera-taken picture 50 can be displayed at adjoining positions, so that the human player can not only execute an instrument performance or the like while viewing the electronic musical score displayed on one of the display screen 2, but also readily photograph him or her while monitoring his or her performing posture and conditions displayed on the other display screen 3.

e. Recording Mode:

The recording mode is an operation mode for recording performance sounds and/or singing voices. When this mode has been selected, the CPU 20 causes the display screen 3 to display an operation button group (not shown) for instructing operations, such as a start of recording, stop of recording and reproduction, and in response to depression of any of the operation buttons, the CPU 20 records sound data, input via the microphone 8, into the user data memory 25, or reproduces sound data recorded in the user data memory 25.

In the recording mode, there is displayed, on the display screen 2, either a musical score that was being displayed immediately before switching to the recording mode or a musical score corresponding to a musical score data set DM designated by the human player, as in the above-described photographing display mode. In this way, the human player can not only execute an instrument performance or the like while viewing the electronic musical score displayed on one of the display screen 2, but also readily record his or her performance sounds or singing voices by activating any of the operation buttons displayed on the other display screen 3.

(2) Supplementary Explanation:

The present invention can be practiced in various manners instead of being limited to the above-described embodiments. For example, the following modifications of the present invention are also possible without departing from the basic principles of the invention.

(2.1)

The embodiments of the present invention have been described above as, whenever a musical score data set DM is to be transmitted from the information processing apparatus 1, having recorded therein the musical score data set DM purchased by the user of the information processing apparatus 1 or to be recorded by the information processing apparatus 1 onto a memory card, rewriting the right-to-use information DM2 of the musical score data set DM into such contents as to inhibit transmission and storage of the data set DM. As a modification, the present invention may be modified so that the purchaser of the musical score data set DM can choose whether or not the transmission and storage of the data set DM should be inhibited. In this way, the purchaser can back up the musical score data set DM as necessary, and even a PC or other musical-score-type information processing apparatus 1 possessed by the purchaser is allowed to store and transmit the musical score data set DM.

(2.2)

Further, whereas the embodiments of the present invention have been described above as allowing a purchaser of a musical score data set DM to freely transmit and store the purchased musical score data set DM, a server providing download service may rewrite the storage authorization flag FS and transmission authorization flag FT of the right-to-use information DM2 in accordance with a purchaser's wish or the like and then supply the musical score data set DM with the rewritten flags FS and FT to the purchaser. Thus, if, for example, the server transmits a musical score data set with the transmission authorization flag FT set at "0" and storage authorization flag FS set at "1", it is possible to set conditions where the purchaser is allowed to store the purchased musical score data set DM but not allowed to transmit the data set DM. Consequently, the purchaser can choose to purchase a storage- and transmission-authorized musical score data set in a case where the data set is to be used for an ensemble performance, but purchase an only-storage-authorized musical score data set in a case where the data set is to be used by the purchaser alone.

(2.3)

Furthermore, whereas the embodiments of the present invention have been described above in relation to the case where the musical-score-type information processing apparatus 1 has, as its operation modes, the Internet mode, communication mode, musical score display mode, photographing mode and recording mode, the musical-score-type information processing apparatus 1 may have only the Internet mode, communication mode and musical score display mode. Namely, it is only necessary that the musical-score-type information processing apparatus 1 have a section for acquiring, from outside, a storage- and transmission-authorized musical score data set via the Internet or memory card, a section for transmitting a musical score data set to another musical-score-type information processing apparatus 1, a section for displaying a musical score on the basis of a musical score data set and a section for storing a musical score data set.

(2.4)

Furthermore, whereas the embodiments of the present invention have been described above in relation to the case where the right-to-use information DM2 includes the storage authorization flag FS and transmission authorization flag FT, the right-to-use information DM2 may use only one authorization flag to collectively set whether storage and transmission of the musical score data set should be authorized or not. Also, in addition to such flag information, there may be provided a flag to set whether editing of a musical score data set should be authorized or not. Moreover, the present invention may use, in place of the flag information, discrimination information to discriminate whether storage and transmission of a musical score data set is authorized or not.

(2.5)

Although the embodiments have been described above in relation to the case where user's instructions are input primarily via the touch panels 11A and 11B, the present invention is not so limited, and any other suitable input devices, such as a tablet and mouse, may of course be used. User's instructions may be given on the basis of voices input via the microphone 8.

(2.6)

Moreover, the embodiments of the present invention have been described above in relation to the case where the musical-score-type information processing apparatus 1 includes display devices, such as the display screens 2 and 3 and liquid crystal display panels 10A and 10B, and an electronic musical score etc. are displayed on these display devices. Alternatively, an electronic musical score etc. may be displayed on a separate or external display connected to the musical-score-type information processing apparatus 1. Furthermore, the inventive equipment capable of restricting transmission and storage on the basis of contents of a musical score data DM may be applied extensively to computers (information processing apparatus), such as PCs and PDAs (Personal Digital Assistants), in addition to the above-described musical-score-type information processing apparatus 1.

(2.7)

Figure 14:
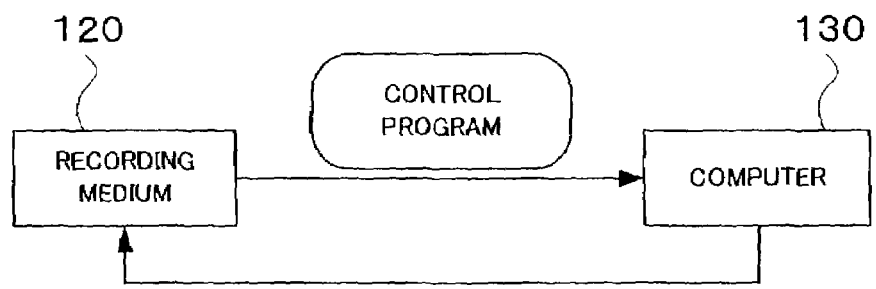
FIG. 14 is a diagram explanatory of a case where a control program is recorded into a computer-readable recording medium.
Figure 15:
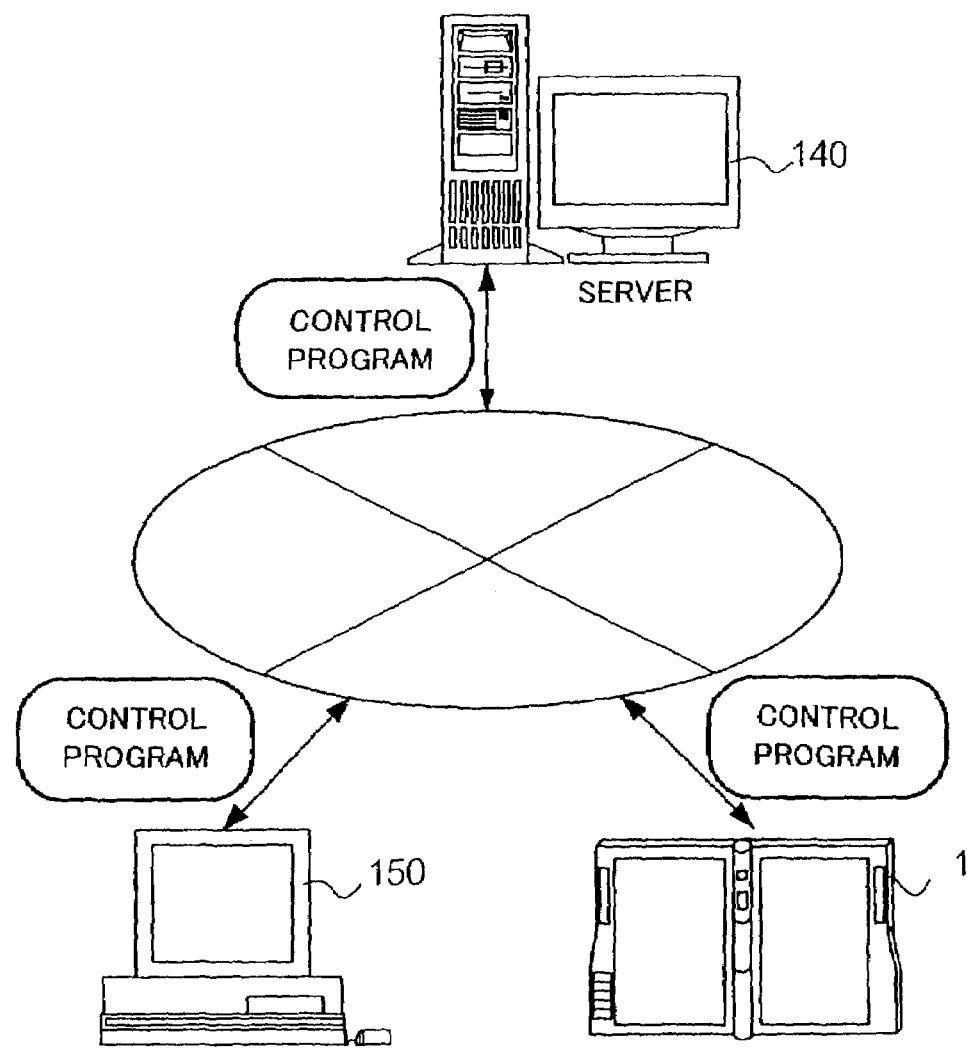
FIG. 15 is a diagram explanatory of a case where a control program is transmitted from a server via a network.

Moreover, the embodiments of the present invention have been described above in relation to the case where control programs for executing various processes, such as one for displaying an externally-received musical score data set DM and one for restricting transmission and storage of a musical score data set DM (e.g., rewriting of the right-to-use information DM2), are prestored in the musical-score-type information processing apparatus 1. Alternatively, as illustratively shown in FIG. 14, such control programs may be recorded in a computer-readable recording medium 120, such as a magnetic recording medium, optical recording medium or semiconductor recording medium, so that any desired one of the recorded control programs is read out and executed by a computer 130. Further, as shown in FIG. 15, the control programs may be stored in a server 140 so that a server 140 transmits, via a network, any desired one of the stored control programs to an information processing apparatus such as the musical-score-type information processing apparatus 1, computer (PC) 150 or the like which has requested transmission of the control program.

In summary, the present invention arranged in the above-described manner allows a musical score data set to be shared between ensemble performers and can also reliably prevent unauthorized alteration and unauthorized copying of musical score data.

What is claimed is:

1. A musical-score-generating information processing apparatus comprising:
   a display device;
   a data input section that inputs musical-score-related data into said information processing apparatus from outside, the musical-score-related data including musical score information and right-to-use information defining a usable range of the musical score information, said right-to-use information including a storage authorization flag and a transmission authorization flag;
   a storage section that stores musical-score-related data input via said data input section;
   an instruction supply section that gives an instruction to be executed by said information processing apparatus;
   a transmission section that transmits, to outside said information processing apparatus, musical-score-related data stored in said storage section; and
   a control section that, when a musical score display instruction is given by said instruction supply section, performs control to read out the musical score information of musical-score-related data stored in said storage section, and that, when a predetermined instruction is given by said instruction supply section, determines, on the basis of the storage authorization flag included in the right-to-use information of corresponding musical-score-related data stored in said storage section, whether or not storage of a corresponding musical score is authorized, said control section performing control to delete the corresponding musical-score-related data from said storage section if said control section determines that the storage of the corresponding musical score is not authorized,
   wherein, when a musical-score-related-data transmission instruction is given by said instruction supply section, said control section reads out musical-score-related data stored in said storage section, and determines, on the basis of the transmission authorization flag included in the right-to-use information of the read-out musical-score-related data, whether or not transmission of the corresponding musical score is authorized, and, if said control section determines that the transmission of the corresponding musical score is authorized, said control section rewrites the storage authorization flag included in the right-to-use information of the read-out musical-score-related data into such contents as to not authorize storage of a corresponding musical score, and then causes said transmission section to transmit the musical-score-related data with the rewritten right-to-use information.

2. A musical-score-generating information processing apparatus as claimed in claim 1, wherein, when a musical score storage instruction or musical-score-display termination instruction is given, as the predetermined instruction, by said instruction supply section, said control section makes the determination, based on the storage authorization flag included in the right-to-use information, as to whether or not the storage of the corresponding musical score is authorized.

3. A musical-score-generating information processing apparatus as claimed in claim 1, further comprising a read/write section that reads out or write data from or to a removable external storage medium, and wherein;
   when a musical score display instruction for displaying musical-score-related data stored in an external storage medium is given by said instruction supply section, said control section causes said read/write section to read out corresponding musical-score-related data stored in the external storage medium and causes said display device to display a musical score based on the musical-score-related data read out by said read/write section, and when a musical score storage instruction or a musical-score-display termination instruction is given by said instruction supply section, said control section causes said read/write section to read out the right-to-use information of corresponding musical-score-related data stored in the external storage medium and determines, on the basis of the storage authorization flag included in the read-out right-to-use information, whether or not storage of a corresponding musical score is authorized, and if the storage of the corresponding musical score is not authorized, said control section causes said read/write section to delete the corresponding musical-score-related data from the external storage medium.

4. A musical-score-generating information processing apparatus as claimed in claim 1, further comprising a read/write section that reads out or write data from or to a removable external storage medium, and wherein a musical score storage instruction for storing a musical score in an external storage medium is given by said instruction supply section, said control section reads out musical-score-related data corresponding to musical score data being displayed on said display device, rewrites the storage authorization flap included in the right-to-use information of the read-out musical-score-related data into such contents as to not authorize storage of a corresponding musical score, and then causes said read/write section to write, into the external storage medium, the musical-score-related data with the rewritten right-to-use information.

5. A musical-score-generating information processing apparatus as claimed in claim 1, wherein said data input section includes a reception section that receives the musical-score-related data via a global communication network.

6. A musical-score-generating information processing apparatus as claimed in claim 1, wherein said data input section includes a reception section that receives the musical-score-related data via a local communication network.

7. A musical-score-generating information processing apparatus as claimed in claim 6, wherein the local communication network is organized by a plurality of said musical-score-generating information processing apparatus.

8. A musical-score-generating information processing method comprising:
   a step of storing, in a memory, musical-score-related data including musical score information and right-to-use information defining a usable range of the musical score information, said right-to-use information including a storage authorization flag and a transmission authorization flag;
   a step of receiving an instruction;
   a step of, when the instruction received by said step of receiving is a musical score display instruction, reading out the musical score information of musical-score-related data stored in the memory;
   a determination/deletion step of, when a predetermined instruction is received by said step of receiving, determining, on the basis of the storage authorization flag included in the right-to-use information of corresponding musical-score-related data stored in the memory, whether or not storage of a corresponding musical score is authorized, and deleting the corresponding musical-score-related data from the memory if the storage of the corresponding musical score is not authorized;
   a determination step of, when a musical-score-data-related transmission instruction is received by said step of receiving, reading out corresponding musical-score-related data stored in the memory, and determining, on the basis of the transmission authorization flag included in the right-to-use information of the read-out musical-score-related data, whether or not transmission of the corresponding musical score is authorized; and
   a transmission step of, if said determination step determines that the transmission of the corresponding musical score is authorized, rewriting the storage authorization flag included in the right-to-use information of the read-out musical-score-related data into such contents as to not authorize storage of a corresponding musical score, and then transmitting the musical-score-related data with the rewritten right-to-use information.

9. A musical-score-generating information processing method as claimed in claim 8, wherein, when a musical score storage instruction or musical-score-display termination instruction is received, as the predetermined instruction, by said step of receiving, said determination/deletion step makes the determination, based on the transmission authorization flag included in the right-to-use information determination, whether or not the storage of the corresponding musical score is authorized.

10. A computer program including a group of instructions for causing a computer to perform a musical-score-generating information processing method, said method comprising:
   a step of storing, in a memory, musical-score-related data including musical score information and right-to-use information defining a usable range of the musical score information, said right-to-use information including a storage authorization flag and a transmission authorization flag;
   a step of receiving an instruction;
   a step of, when the instruction received by said step of receiving is a musical score display instruction, reading out the musical score information of musical-score-related data stored in the memory, and
   a determination/deletion step of, when a predetermined instruction is received by said step of receiving, determining, on the basis of the storage authorization flag included in the right-to-use information of corresponding musical-score-related data stored in the memory, whether or not storage of a corresponding musical score is authorized, and deleting the corresponding musical-score-related data from the memory if the storage of the corresponding musical score is not authorized.

11. A machine-readable storage medium containing the computer program recited in claim 10.

12. A machine-readable storage medium containing a musical-score-related data set including musical score information and right-to-use information specifying a usable range of the musical score information, the right-to-use information including a storage authorization flag and a transmission authorization flag, said storage authorization flag indicating that storage of, a corresponding musical score is authorized or not authorized said transmission authorization flag indicating that transmission of the corresponding musical score is authorized or not authorized.

* * * * *

UNITED STATES PATENT AND TRADEMARK OFFICE
CERTIFICATE OF CORRECTION

PATENT NO. : 7,019,204 B2
APPLICATION NO. : 10/369394
DATED : March 28, 2006
INVENTOR(S) : Kosei Terada It is certified that error appears in the above-identified patent and that said Letters Patent is hereby corrected as shown below:

TITLE PAGE, INSERT

--ITEM (30)   Foreign Application Priority Data

February 18, 2002  (JP)  ............2002-040573--

Signed and Sealed this

Eleventh Day of July, 2006

JON W. DUDAS
*Director of the United States Patent and Trademark Office*